Feb. 27, 1945.　　　G. L. HURST　　　2,370,354
QUICK DETACHABLE COUPLING
Filed June 7, 1943　　　2 Sheets-Sheet 1

INVENTOR.
GEORGE L. HURST
BY
Boylan, Mohler & Beckley
ATTORNEYS.

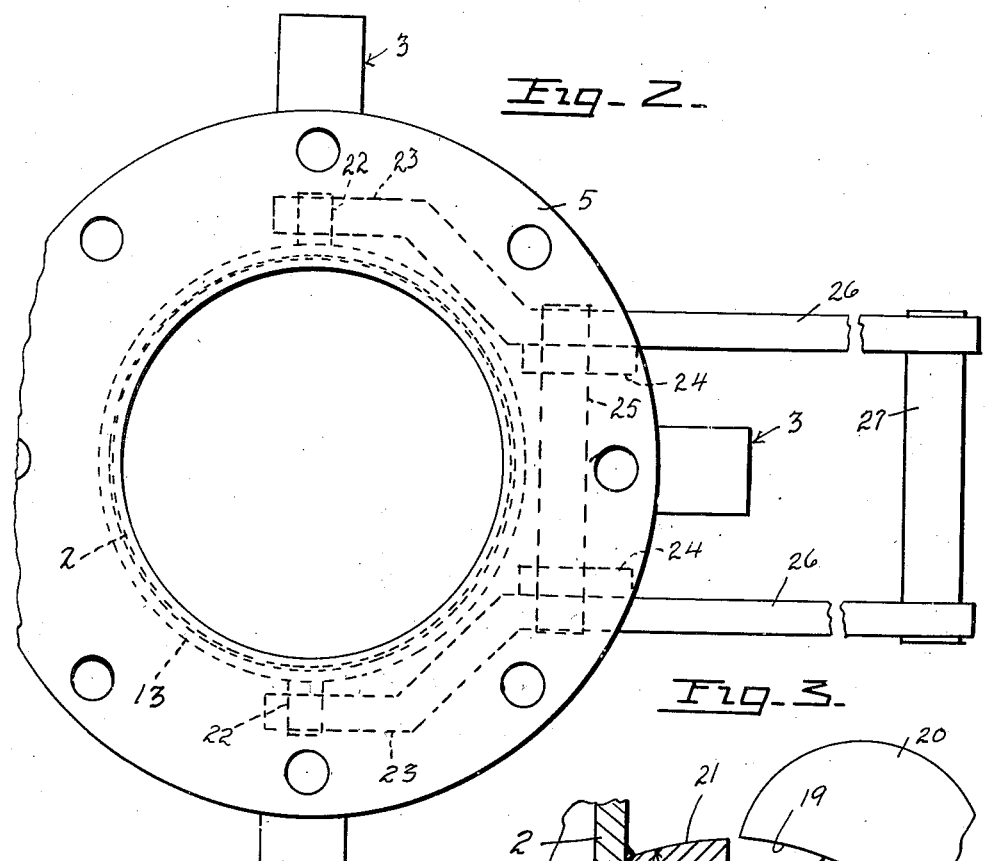
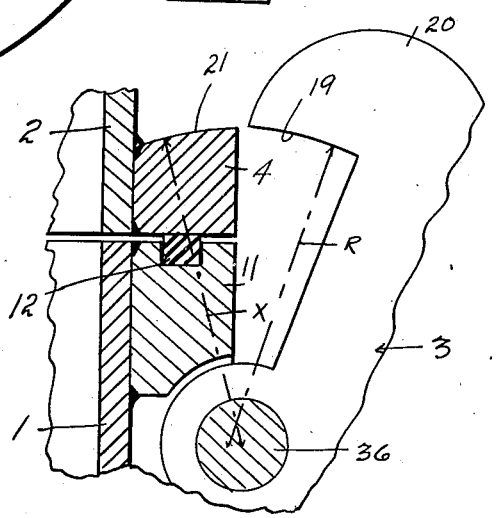

Patented Feb. 27, 1945

2,370,354

UNITED STATES PATENT OFFICE 2,370,354

QUICK DETACHABLE COUPLING

George L. Hurst, San Francisco, Calif.

Application June 7, 1943, Serial No. 489,906

7 Claims. (Cl. 285—172)

This invention relates to a quick detachable coupling, and has for its principal objects the provision of a relatively heavy duty hose coupling that is economical to make, and one that insures a tight seal between the coupled parts, and which coupling is easily and quickly operated for coupling and uncoupling a hose in a fluid line.

One of the places where the coupling of this invention is most frequently used is on oil and fuel supply vessels during the transfer of such oil or fuel from the supply vessel to another ship. In effecting such transfer, a hose and mooring lines extend between the ships and the oil and fuel is pumped from the supply vessel through the hose into the other ship. Fittings are generally rigidly secured to each of the two ships to which the ends of the hose is secured, such fittings generally comprising an annular flange on each vessel to which similar flanges on the hose ends are bolted. To steady the ships somewhat during the transfer and to maintain a uniform distance between them, it is customary for both ships to maintain some headway at the same speed. In a calm sea with no unusual disturbance from winds, currents, etc., a satisfactory transfer of fuel or oil can generally be effected without accident. Under less favorable conditions, however, it frequently happens that hose lines are broken, which is very costly from the standpoint of materials, to say nothing of the loss of time in reestablishing the connection between the ships where extra hose is carried for such an emergency.

With the coupling of this invention, the parts carried by the hose are substantially no more complicated or costly than the conventional flanged elements heretofore in use, and such elements may be almost instantly coupled to the coupling elements of other fuel or oil lines, and the coupling can be instantly disconnected whenever desired, by a simple movement on the part of an operator.

Efforts to accomplish the above results have been made before, but insofar as I am aware, such couplings have required interfitting or interlocking elements made with such precision that even slight corrosion or small fractional variations have rendered them inoperative for accomplishing the desired results. Since these couplings are used on 6, 8, 12 inch hose, and the like, it is seen that they are large and relatively heavy, and it is essential that they function properly when needed even though subjected to the detrimental effects of salt water.

Other objects and advantages will appear in the drawings and specifications.

In the drawings,

Fig. 2 is a fragmentary plan view of the coupling of Fig. 1 separate from the hose showing the structure of the operating handle in full and dotted line.

Fig. 3 is an enlarged fragmentary sectional view of the upper end of one of the clamping dogs and the collar engageable therewith.

Figure 1:
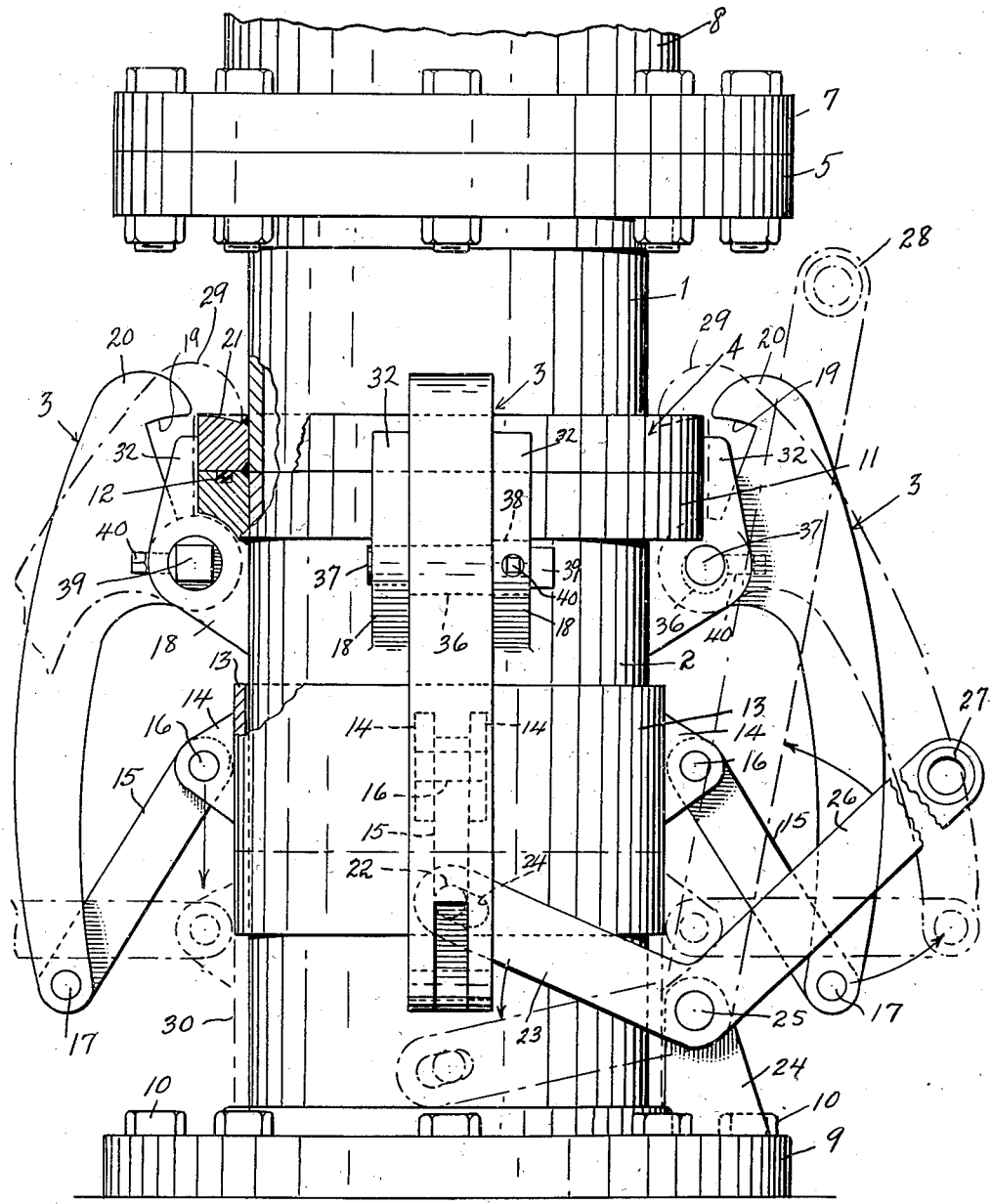
Fig. 1 is an elevational view of a coupling with the clamp dogs and their operating handle shown in unlocked position in full line, and in locked position in dot-dash line.

The following detailed description of the drawings is not to be considered restrictive of the invention but merely illustrative.

In detail, the coupling comprises a cylindrical, open-ended hose section 1 and a similar diameter cylindrical open-ended clamping section 2. When in coupled relationship the said sections 1, 2 are in axial alignment and are detachably secured together at their adjacent ends by pivoted clamping dogs 3 carried on section 2, as will be hereinafter described, and which dogs are engageable with a collar 4 secured on section 1.

The outer end of section 1 (upper end in Fig. 1) is provided with an annular, outwardly projecting flange 5 apertured for bolts 6 for bolting section 1 to the conventional flange 7 of a hose fitting secured to one end of hose 8.

The outer end of section 2 (lower end in Fig. 1) is provided with an annular outwardly projecting flange 9 that is generally similar to flanges 5, 7, and which flange 9 is apertured for bolts 10 for bolting said flange to a ship's pipe fitting or to another hose, or a reservoir fitting, or wherever desired. Ordinarily, flange 9 is bolted to a valved fluid line if the section 2 is at the inlet end of hose relative to the direction of flow of fluid in said hose, while if at the outlet end, the flange may be bolted to a suitable fitting carried by a tank or reservoir that received the fluid.

The end of section 1 that is adjacent section 2 carries the collar 4, which collar may be welded to section 1. The side of the collar 4 facing flange 5 is preferably slightly undercut transversely of its width providing a convexly curved cross-sectional contour following lines inscribed about radii R (Fig. 3) that are adjacent the pivots mounting the clamping dogs 3.

The end of section 2 that is adjacent section 1 carries a collar 11 that may be welded to said section. The axially facing side of collar 11 that is adjacent collar 4 is formed with a groove in which is carried an annular packing ring 12 of any suitable material, such as compressible synthetic rubber. When the adjacent sides of collars 4, 11 are drawn toward each other by the action of clamping dogs 3 the ring 12 will form a tight, fluid proof seal between the sections.

Slidable axially on section 2 is a toggle sleeve 13, and equally spaced pairs of ears 14 project outwardly from said sleeve near the upper edge of the latter. Between each pair of said ears (there are four pairs in the device illustrated) is pivoted one end of a toggle link 15 by a pivot 16 for swinging of said links in radial planes parallel with the axis of section 2. The outer end of each toggle link is pivoted at 17 to one end of each of the clamping dogs 3. These dogs are vertically elongated members (as seen in Fig. 1) that extend between pairs of ears 18 to which they are pivoted and across said collars 11, 4 to above the latter at their upper ends.

The upper end of each clamping dog is generally hook shaped with the hooked end projecting toward the axis of the sections 1, 2 when the latter are axially aligned. The under surface 19 of each hooked end is adapted to slidably engage the convexly curved contour of the undercut side of collar 4. Said surface of each dog is curved to follow a line inscribed about a radius having its center slightly offset to the side of the axis of the pivot mounting the dog in direction toward the axis of section 2. Thus as the lower end of each clamping dog is swung outwardly relative to section 2, the curved under side 19 of the hook end 19 at the upper end of each dog (Fig. 3) will engage the curved upper surface 21 of the collar 4 in a manner to progressively draw the collar 4 toward collar 11 compressing the sealing ring 12 so that a tight seal will be effected between the sections 1, 2. The said surface 20 follows a curve having the center of its radius at substantially the axis of the pivot mounting each clamping dog (Fig. 3).

The sliding of toggle sleeve 13 axially on section 2 toward flange 9 will effect a simultaneous pivoting of the clamping dogs 3 for clamping the sections 1, 2 together, and when the sleeve 13 is at the lower end of its stroke, the pivots 16 that connect toggle links 15 thereto will preferably have moved slightly across the line where pivots 16, 17 at opposite sides of the sleeve are in alignment, thus positively locking the sections 1, 2 together until the sleeve is forcibly moved away from flange 8 to carry pivots 16 back across the dead center alignment of pivots 16, 17 perpendicular to the central axis of section 2.

The means for reciprocating sleeve 13 on section 2 comprises a pair of axially aligned pins or stub shafts 22 projecting from opposite sides of sleeve 13 near its lower edge. These pins are spaced below two opposite pairs of ears 14 that are on sleeve 13. The arms 23 of a pair thereof are pivotally and slidably connected at one of their ends to said pins by means of slots 24 in said ends into which said pins extend.

The arms 23 extend generally convergently from their ends at pins 22 around the section 2 to opposite outer sides of a pair of spaced lugs 24 to which the arms are pivoted by a pivot 25 (Fig. 2).

Lugs 24 are secured to flange 9, and from pivot 25 the arms 23 extend angularly upwardly and outwardly of section 2 as at 26 and are connected at their outer ends by a tubular handle 27. The portions 26 of said arms 23 are spaced apart to clear one of the clamping dogs that is positioned therebetween, and the angularity between said arms at opposite sides of pivot 25 is preferably such that when handle 27 is in the dot-dash position 28 (Fig. 1) the portions 26 of said arms will extend alongside the sections 1, 2 and the clamping dogs will be in clamping position 29 (dot-dash lines, Fig. 1) and sleeve 13 will be in position 30. Thus, the coupling forms a compact assembly when the sections 1, 2 are coupled together, and even though the coupling were rolled on its side, or were bumped by workmen or materials handled by the latter, the coupling would not become disconnected, since only a positive outward and downward swing of handle 27 from position 28 (as seen in Fig. 1) will unlock the sections 1, 2.

To facilitate coupling the sections together and to insure against undesirable strains on or interference with the clamping dogs when said sections are coupled and uncoupled, I provide extensions 32 on the ears 18, which extensions project axially of section 2 outwardly of collar 11. The radially inwardly facing sides of the projecting ends of said extensions thus hold the collar 4 of section 1 coaxial with collar 11, and in a position to insure proper clamping by clamping dogs 3. Also when the sections are uncoupled when there is a lateral strain on the hose section 1, the provision of extensions 32 prevents any catching or objectionable striking of section 1 on the dogs 3. Of course, the coupling would not be rendered inoperable in an emergency were the extensions 32 to become broken, but their presence is considered quite important for perfect operation of the coupling in connecting and disconnecting the sections under all conditions and in the shortest time.

The cam action of the curved undersurface 19 of the cam dogs on the curved undercut surface of collar 4 would normally require very careful and accurate machining, since it is desirable that all clamping dogs be substantially equal in the force applied for connecting the sections. The structure illustrated and for pivotally mounting the clamping dogs 3 provides means for easily and quickly adjusting the dogs to compensate for any inaccuracies in machining or the making of parts of the coupling, and for adjusting the dogs relative to each other and to collar 4.

This structure comprises the pins that pivotally support the dogs between the pairs of ears 18. The central portion 36 of each pin (Fig. 1) is eccentric to the concentric end portions 37, 38 that are respectively supported in coaxial openings in each pair of ears 18. End 38 is preferably of larger diameter than portions 36, 37, and has a square end extension 39 projecting from the ear 18 adjacent thereto to facilitate turning the pin with a wrench or pliers. A set screw 40 extending through the last mentioned ear secures the pin in adjusted position and against axial movement in one direction. By rotation of these pivot pins mounting the clamping dogs, the latter can be quickly adjusted to compensate for any wear in any of the pivots such as 16, 17 and 36, and also the clamping dogs can be adjusted to equalize their clamping action due to inaccuracies or variations in parts.

In operation, assuming section 2 is bolted to a stationary part of a ship and section 1 is coupled thereto, the handle 28 will be in a position where its only possible movement is outward. Any seaman or ordinary workman, knowing that swinging of the handle would effect an uncoupling of the sections 1, 2 could not become confused in uncoupling the sections as to the direction of its movement since the handle is closely alongside the sections and can only move outwardly. Thus a workman assigned to watch the hose line and to uncouple it if there seemed danger of breakage, would quickly pull the handle 28 away from the sections and they will immediately be uncoupled, thus saving the hose 8 from being broken. Or any observer seeing the danger could quickly uncouple the sections without being confused as to how to do it.

It is pertinent to note that the structure herein disclosed is applicable to use with large diameter hose lines, and with this in mind, the use of four equally spaced clamping dogs is preferable, whereas with small hose lines it is possible that three might be used with some degree of success. Also there are no threaded parts that require turning to release or to connect the parts. The elements used in this invention are simple and economical to make and are reliable in operation irrespective of such corrosion as might result from normal exposure to salt water between servicing of the parts.

Having described my invention, I claim:

1. A quick detachable coupling including a pair of separable tubular members adapted to be coupled together in coaxial alignment, means for releasably coupling said members together comprising a plurality of clamping dogs pivotally secured to one of said members for swinging on their pivots into and out of clamping engagement with the other of said members, toggle links pivotally secured at one of their ends to said dogs respectively for causing said swinging of said dogs upon reciprocatory movement of the opposite ends of said links, means connecting said opposite ends of said links for such movement of said ends simultaneously, and a handle connected to said means for manually reciprocating the latter for thereby actuating said links and said dogs to couple or to uncouple said members according to the direction in which said means is moved.

2. A quick detachable coupling including a pair of separable, open-ended, tubular members adapted to be releasably coupled together in coaxial alignment, an annular outwardly projecting flange on one of said members, a plurality of clamping dogs pivotally secured to the other of said members for swinging of one of their ends generally radially of the axis of said member into and out of clamping engagement with said flange for coupling or uncoupling said members as desired, a sleeve reciprocable on said other member connecting said dogs together for such swinging of the latter simultaneously, and an arm pivotally connected to said sleeve and to said other member for so reciprocating said sleeve.

3. A quick detachable coupling including a pair of separable, open-ended, tubular members adapted to be releasably coupled together in coaxial alignment, an annular outwardly projecting flange on one of said members, a plurality of clamping dogs pivotally secured to the other of said members for swinging of one of their ends generally radially of the axis of said member into and out of clamping engagement with said flange for coupling or uncoupling said members as desired, a sleeve reciprocable on said other member connecting said dogs together for such swinging of the latter simultaneously, and an arm pivotally connected to said sleeve and to said other member for so reciprocating said sleeve, toggle links pivotally connected at one of their ends to said dogs respectively and pivotally connected at their opposite ends to said sleeve.

4. A quick detachable coupling including a pair of separable, open-ended, tubular members adapted to be releasably coupled together in coaxial alignment, an annular outwardly projecting flange on one of said members, a plurality of clamping dogs pivotally secured to the other of said members for swinging of one of their ends generally radially of the axis of said member into and out of clamping engagement with said flange for coupling or uncoupling said members as desired, a sleeve reciprocable on said other member connecting said dogs together for such swinging of the latter simultaneously, and an arm pivotally connected to said sleeve and to said other member for so reciprocating said sleeve, the pivot connecting said arm to said other member being positioned to support said arm for movement from a position extending alongside said other member when said dogs are in clamping engagement with said flange to a position extending generally radially therefrom for releasing said dogs.

5. A quick detachable coupling including a pair of separable, open-ended tubular members adapted to be coupled together in coaxial alignment, a plurality of equally spaced guide elements secured to one member of said pair and projecting axially therefrom for holding the other member of said pair in axial alignment therewith and for guiding the other member to such alignment, clamping dogs pivotally secured to said one member adjacent each of said guide elements and projecting axially from said one member for engaging the said other member of said pair when said other member is held by said guide members coaxial with said one member, said clamping dogs being swingable on their pivots to positions out of engagement with said other member for releasing the latter, and means for so swinging said dogs simultaneously, said last mentioned means including a sleeve reciprocable on said one member and a link pivotally connected thereto and pivotally connected to each of said clamping dogs.

6. A quick detachable coupling including a pair of separable open-ended tubular members adapted to be coupled together in coaxial alignment, a radially outwardly projecting flange on one member of said pair at its end adapted to abut one end of the other member when said members are so coupled together, a plurality of clamping dogs secured to said other member and extending across the adjacent ends of said members and past said flange into clamping engagement with the side of the latter that faces axially away from said other member for clamping said members together, pivots mounting said clamping dogs on said other member for swinging said dogs thereon radially outwardly of said flange for uncoupling said members, and means for varying the clamping tension of each of said dogs on said flange independently of the other dogs whereby variations in such clamping tension may be equalized.

7. A quick detachable coupling including a pair of separable open-ended tubular members adapted to be coupled together in coaxial alignment, a radially outwardly projecting flange on one member of said pair at its end adapted to abut one end of the other member when said members are so coupled together, a plurality of clamping dogs secured to said other member and extending across the adjacent ends of said members and past said flange into clamping engagement with the side of the latter that faces axially away from said other member for clamping said members together, pivots mounting said clamping dogs on said other member for swinging said dogs thereon radially outwardly of said flange for uncoupling said members, and means for varying the clamping tension of each of said dogs on said flange independently of the other dogs whereby variations in such clamping tension may be equalized, the flange-engaging portion of each of said dogs comprising an arcuately extending surface substantially coincident with a line inscribed about a radius slightly offset to one side of the axis of the pivot mounting each dog, and the portion of the said flange engageable by each dog being a curved surface substantially coincident with a line inscribed about the radius having said axis as a center.

GEORGE L. HURST.